(12) United States Patent
Tu et al.

(10) Patent No.: US 10,923,968 B2
(45) Date of Patent: Feb. 16, 2021

(54) COMBINED WIRELESS CHARGING AND POSITION TRACKING

(71) Applicant: MediaTek Inc., Hsinchu (TW)

(72) Inventors: Yungszu Tu, New Taipei (TW); Da-Shan Shiu, Taipei (TW); Vladimir Alexander Muratov, Manchester, NH (US)

(73) Assignee: MediaTek Inc.

( * ) Notice: Subject to any disclaimer, the term of this patent is extended or adjusted under 35 U.S.C. 154(b) by 334 days.

(21) Appl. No.: 15/918,865

(22) Filed: Mar. 12, 2018

(65) Prior Publication Data
US 2019/0280535 A1  Sep. 12, 2019

(51) Int. Cl.
| H02J 7/00 | (2006.01) |
|---|---|
| H02J 50/90 | (2016.01) |
| H02J 50/40 | (2016.01) |
| H02J 50/10 | (2016.01) |

(52) U.S. Cl.
CPC .............. *H02J 50/90* (2016.02); *H02J 50/10* (2016.02); *H02J 50/40* (2016.02)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| 10,270,298 B1* | 4/2019 | Gupta | .................. | G06F 16/951 |
| 2014/0183964 A1* | 7/2014 | Walley | .................. | H02J 50/40 |
| | | | | 307/104 |
| 2014/0292268 A1* | 10/2014 | Griepentrog | ............ | B60L 53/12 |
| | | | | 320/108 |
| 2015/0042169 A1* | 2/2015 | Park | ........................ | H02J 50/12 |
| | | | | 307/104 |
| 2015/0365137 A1* | 12/2015 | Miller | .................. | H01M 10/425 |
| | | | | 307/104 |

FOREIGN PATENT DOCUMENTS

| CN | 101610093 A | 12/2009 |
|---|---|---|
| CN | 106410982 A | 2/2017 |
| CN | 107101571 A | 8/2017 |
| TW | 201740691 A | 11/2017 |
| WO | WO 2014176853 A1 | 11/2014 |

OTHER PUBLICATIONS

Taiwan Intellectual Property Office, Office Action for Taiwan Patent Application No. 108107236, dated Nov. 21, 2019.
China National Intellectual Property Administration, Office Action for China Patent Application No. 201910172891.1, dated Jun. 3, 2020.

* cited by examiner

*Primary Examiner* — Arun C Williams
(74) *Attorney, Agent, or Firm* — Han IP PLLC; Andy M. Han

(57) ABSTRACT

Techniques and examples pertaining to combined wireless charging and position tracking are described. A method may involve a processor of an apparatus operating in a first mode to effect wireless charging via at least a first coil of a plurality of coils of the apparatus. The method may also involve the processor operating in a second mode to effect position tracking via at least a second coil of the plurality of coils of the apparatus.

16 Claims, 8 Drawing Sheets

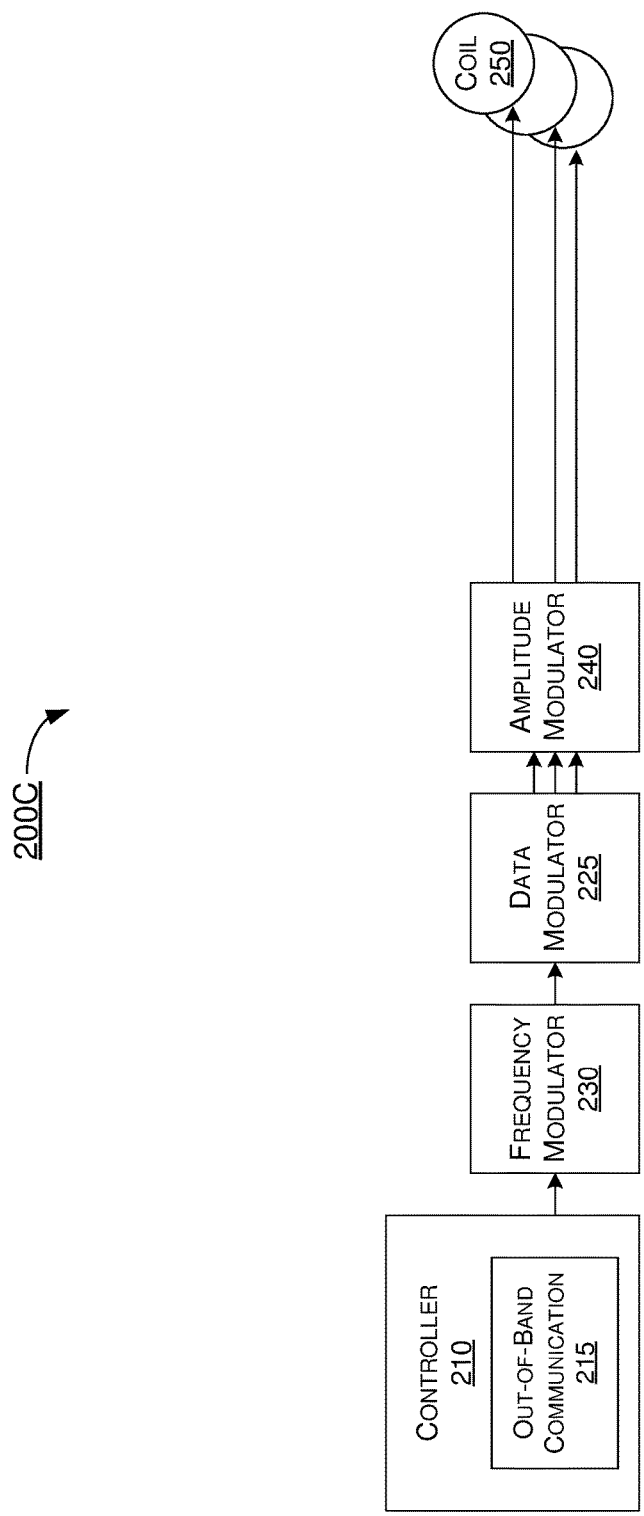

600

OPERATE IN A FIRST MODE TO EFFECT WIRELESS CHARGING VIA AT LEAST A FIRST COIL OF A PLURALITY OF COILS OF AN APPARATUS
610

| WIRELESSLY EMIT ENERGY VIA AT LEAST THE FIRST COIL AS A CHARGING STATION TO CHARGE A POWER RECEIVER 612 | WIRELESSLY RECEIVE ENERGY VIA AT LEAST THE FIRST COIL AS A POWER RECEIVER 614 |

OPERATE IN A SECOND MODE TO EFFECT POSITION TRACKING VIA AT LEAST A SECOND COIL OF THE PLURALITY OF COILS OF THE APPARATUS
620

| WIRELESSLY RADIATE ELECTROMAGNETIC (EM) WAVES VIA AT LEAST THE SECOND COIL AS A BEACON STATION TO TRACK A POSITION OF A SENSOR 622 | DETECT EM WAVES FROM A BEACON STATION VIA AT LEAST THE SECOND COIL AS A SENSOR TO DETERMINE A POSITION OF THE BEACON STATION 624 |

FIG. 6

COMBINED WIRELESS CHARGING AND POSITION TRACKING

TECHNICAL FIELD

The present disclosure is generally related to wireless charging and position tracking and, more particularly, to methods and apparatuses of combined wireless charging and position tracking.

BACKGROUND

Unless otherwise indicated herein, approaches described in this section are not prior art to the claims listed below and are not admitted as prior art by inclusion in this section.

Wireless charging, also known as inductive charging, is a technology that uses an electromagnetic (EM) field to transfer energy between two objects through EM induction. Energy is transferred via an inductive coupling from a charger to an electrical device. Wireless charging has recently gained widespread acceptance for use in mobile/portable electronics. The same charger can charge one or more devices without the use of dedicated and often incompatible charging cables.

Position tracking is a central functionality in many mobile applications. Various technologies exist for position tracking and may be generally categorized into non-radio technologies and wireless technologies. Non-radio technologies for position tracking typically include magnetic field-based positioning, inertial measurements, positioning based visual markers and/or known visual features. Wireless technologies for position tracking typically include Global Positioning System (GPS), Wi-Fi-based positioning, Bluetooth and so on.

While both wireless charging and position tracking are desirable features for mobile devices, these two technologies typically have nothing in common. If an application desires both wireless charging and position tracking functionalities, the current practice is to procure one dedicated modality for wireless charging and a separate dedicated modality for position tracking.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure describes concepts and implementations related to meaningfully combining wireless charging and position tracking together. For applications that use the dual functionalities of wireless charging and position tracking, implementations in accordance with the present disclosure potentially deliver advantages at least in terms of cost, size, power efficiency, and ease of use. For position tracking-only applications, concepts of the present disclosure allow implementation of position tracking to leverage the presently mature value chain of wireless charging.

In one aspect, a method may involve operating in a first mode to effect wireless charging via at least a first coil of a plurality of coils of an apparatus. The method may also involve operating in a second mode to effect position tracking via at least a second coil of the plurality of coils of the apparatus.

In one aspect, an apparatus may include a processor. The processor may be operable in a first mode to effect wireless charging via at least a first coil of a plurality of coils of an apparatus. The processor may be further operable in a second mode to effect position tracking via at least a second coil of the plurality of coils of the apparatus.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2C is a diagram of an example scheme in accordance with an implementation of the present disclosure.

FIG. 6 is a flowchart of an example process in accordance with an implementation of the present disclosure.

DETAILED DESCRIPTION OF PREFERRED IMPLEMENTATIONS

Figure 1:
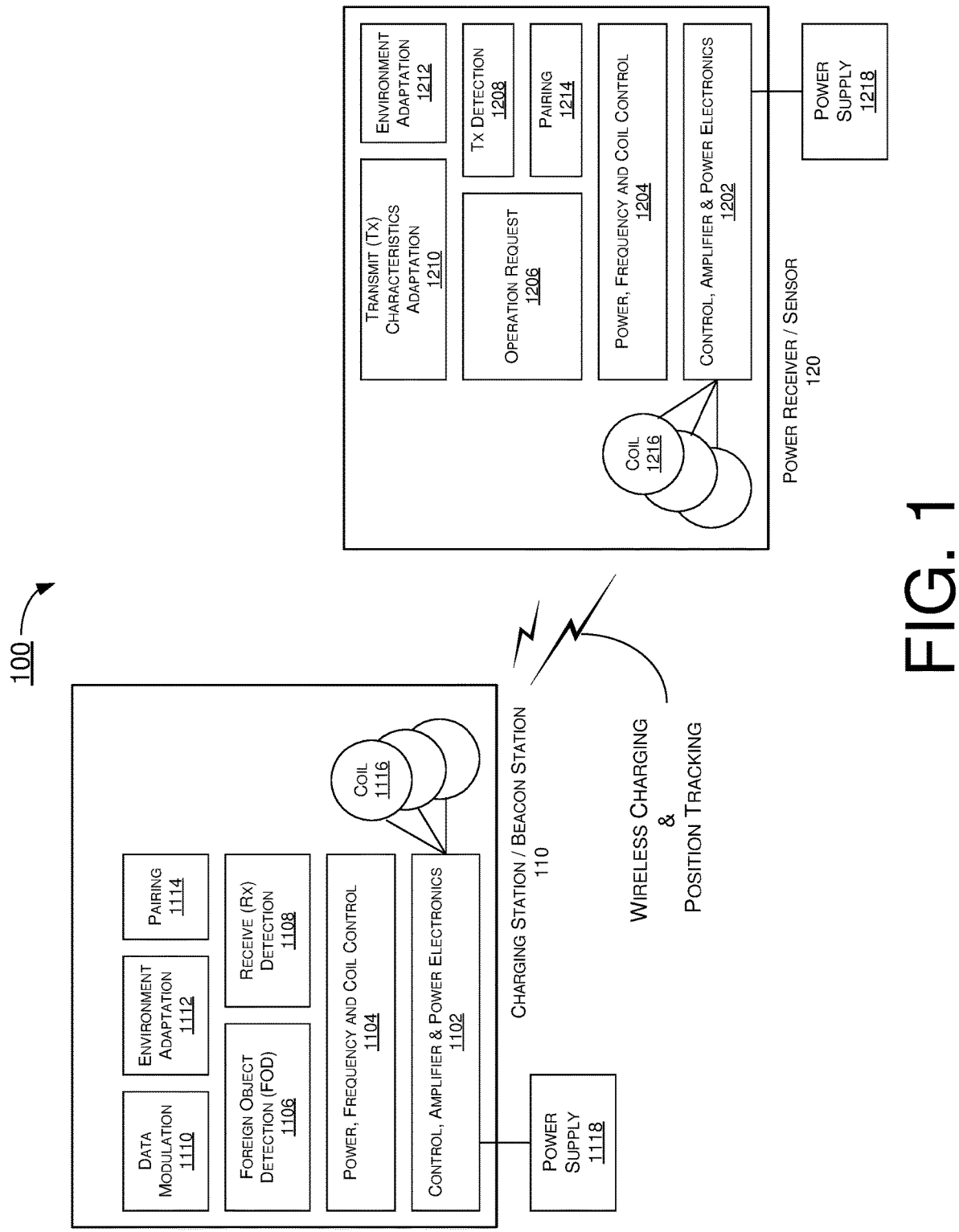
FIG. 1 is a diagram of an example dual-function system in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

To date, wireless charging and EM position tracking are two entirely separate concepts, and various aspects of the two concepts—from system requirement and design to implementation—are done separately. If an application needs the functionalities of both wireless charging and position tracking, the current practice is to procure one dedicated modality for wireless charging and another dedicated modality for position tracking. For applications that use dual functionalities, implementations in accordance with the present disclosure can deliver advantages in terms of cost, size, power efficiency and ease of use.

One key concept in various implementations in accordance with the present disclosure is that, for both wireless charging and EM position tracking, a fundamental requirement is to radiate a magnetic field in space through the use of coils. On the receiving end, another fundamental requirement is to capture or otherwise harness the magnetic field through the use of receive coils. Additionally, a number of procedures have been defined for wireless charging such as transmitter-receiver pairing, receiver proximity detection, wireless charging request, foreign object detection, and so on, despite differences among various prominent wireless charging specifications. The concepts of such wireless charging procedures are applicable to position tracking. Accordingly, in various implementations in accordance with the present disclosure, wireless charging procedures are adapted or otherwise leveraged for position tracking. Moreover, although incompatibilities exist between wireless charging and position tracking, one can meaningfully co-implement these two functionalities together through proper engineering described herein.

From the perspective of extending a wireless charging setup to also support position tracking, key challenges that need to be overcome include, but are not limited to, extending the parameters and capability of wireless charging beyond the requirements to cover those necessary for position tracking. These include the following: additional operational frequency range, precise frequency and amplitude control, frequent and fast converging coil switching, modulation mechanisms to allow for simultaneous operation of multiple beacon stations in the same space, modified mechanism to detect the presence of and to communicate with sensor(s), modified mechanism for foreign object detection, modification of receiver circuit to observer but not take energy from an incoming magnetic field. Nevertheless, according to the present disclosure, a satisfactory position tracking functionality can be obtained by proper extension of the capability of an underlying wireless charging implementation.

From the perspective of adapting a position tracking technique to be implemented via a wireless charging setup, key challenges that need to be overcome include, but are not limited to, designing a system to compromise with the operational frequency range of wireless charging, adaptation mechanism to avoid or mitigate nearby on-going wireless charging operation, front-end designs that can switch between wireless charging and position tracking modes at both the beacon stations and the sensors.

FIG. 1 illustrates an example dual-function system 100 in accordance with an implementation of the present disclosure. Referring to FIG. 1, dual-function system 100 includes a first apparatus 110 and a second apparatus 120. First apparatus 110 is capable of the functionalities of a charging station for wireless charging and a beacon station for position tracking, and is paired with second apparatus 120, which is capable of the functionalities of a power receiver for wireless charging and a sensor for position tracking.

Each of first apparatus 110 and second apparatus 120 includes a number of functional blocks implementable in hardware (e.g., circuits/electronics), software or a combination of hardware and software. For instance, first apparatus 110, functioning as a charging station and a beacon station, may include the following functional blocks: control, amplifier and power electronics 1102, power, frequency and coil control 1104, foreign object detection (FOD) 1106, receiver (Rx) detection 1108, data modulation 1110, environment adaptation 1112, pairing 1114 and coils 1116. Similarly, second apparatus 120, functioning as a power receiver and a sensor, may include the following functional blocks: control, amplifier and power electronics 1202, power, frequency and coil control 1204, operation request 1206, transmit (Tx) detection 1208, Tx characteristics adaptation 1210, environment adaptation 1212, pairing 1214 and coils 1216. Each of first apparatus 110 and second apparatus 120 may also include a power supply 1118 and power supply 1218, respectively. Power supply 1118 (e.g., power mains or battery) may be physically internal or external to first apparatus 110. Power supply 1218 (e.g., battery) may be physically internal or external to second apparatus 120.

Each of first apparatus 110 and second apparatus 120 may operate in either of a wireless charging mode and a position tracking mode. In the wireless charging mode, first apparatus 110 may function as a typical charging station or charging pad, and second apparatus 120 may function as a power receiver. In the position tracking mode, first apparatus 110 may function as a beacon station, and second apparatus 120 may function as a sensor. Some or all of the same physical resources of each of first apparatus 110 and second apparatus 120 may be shared for the dual functions of wireless charging and position tracking.

Differences in Frequency Bands

One challenge, in particular, that needs to be overcome stems from the fact that the frequencies used by existing wireless charging products (typically at 100 kHz or higher) are vastly different from the frequencies used by existing EM position tracking products (typically at 20 kHz or lower). In one implementation according to the present disclosure, a position tracking system may be designed using a wireless charging frequency. This allows the most re-use of wireless charging hardware resources. One downside of this implementation involves a head-to-toe system redesign and potentially compromised performance. In another implementation according to the present disclosure, the supported frequency range of a wireless charging solution may be extended. For instance, the clock source, clock divider option, the number of clock domains inside an integrated circuit (IC) may be expanded to cover the frequency band ideal for position tracking.

Multi-Coil Operation

Depending on the purpose and the operational principle, the operation of a beacon station may require the beacon station to radiate via more than one coil. It is noteworthy that, although a fixed number (e.g., three) of coils may be shown in the illustrative figures, different numbers of coils may be utilized in various implementations in accordance with the present disclosure.

For some wireless charging configuration, a charging pad may utilize multiple coils, individually or simultaneously. For wireless charging the purpose is to allow inaccurate placement of the power receiver. A well-designed system would select an optimal coil among the multiple coils to use. For a dual-function/dual-mode apparatus, this functionality may be adapted to drive the multiple coils for positioning. In order for position tracking to function properly, on the sensor side (e.g., apparatus 120), the sensor needs to be able to discern and distinguish the magnetic field radiated from each of the coils of the beacon station.

The present disclosure provides a number of schemes to differentiate the magnetic field from each of multiple coils. Specifically, the coils may be time-division multiplexed (TDM), frequency-division multiplexed (FDM) or code-division multiplexed (CDM). In TDM, the coils may radiate in turn temporally. In FDM, each coil may radiate at a respective frequency different that of another coil. In CDM, custom-designed data may be modulated onto the signal driven into each coil. For illustrative purposes and without limiting the scope of the present disclosure, examples of transmit signal multiplexing by leveraging a wireless charging architecture via TDM, FDM and CDM are shown in FIG. 2A, FIG. 2B and FIG. 2C, respectively.

Figure 2A:
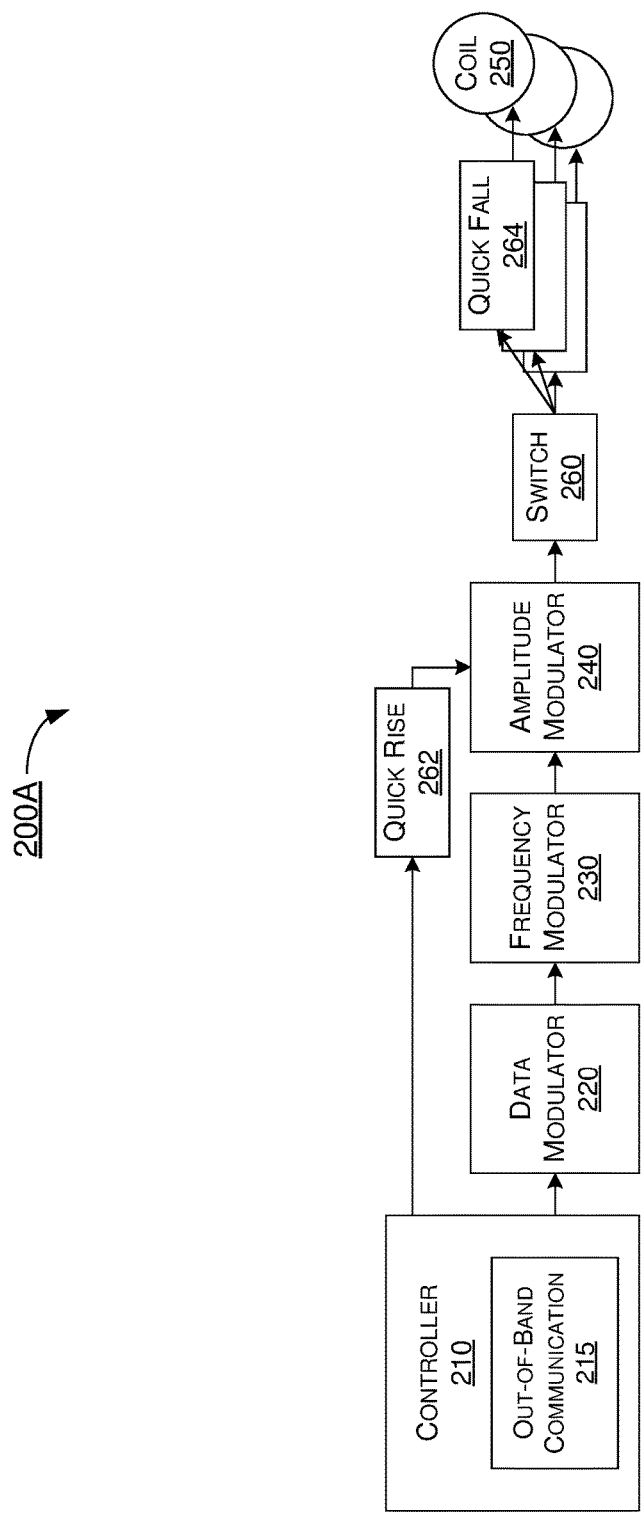
FIG. 2A is a diagram of an example scheme in accordance with an implementation of the present disclosure.

FIG. 2A illustrates an example TDM scheme 200A in accordance with an implementation of the present disclosure. Under the TDM scheme 200A, a modified wireless charging architecture of a dual-function apparatus includes a number of functional blocks, implementable in hardware (e.g., circuits/electronics), software or a combination of hardware and software, to provide the function of position tracking. Referring to FIG. 2A, the TDM scheme 200A may involve the following functional blocks: controller 210, data modulator 220, frequency modulator 230, amplitude modulator 240, multiple coils 250, switch 260, quick rise 262 and quick fall 264. The functional block of controller 210 may include the sub-functional block of out-of-band communication 215 for out-of-band communication. Controller 210 may control operations of data modulator 220, frequency modulator 230, amplitude modulator 240, coils 250, switch 260, quick rise 262 and quick fall 264. Each of data modulator 220, frequency modulator 230, amplitude modulator 240 may modulate a respective aspect of a signal (namely: data, frequency and amplitude) to be transmitted via coils 250. Controller 210 may control switch 260 to select one of the multiple coils 250 at a time to transmit the signal by way of radiated EM waves. Controller 210 may control quick rise 262 and quick fall 264 to cause a quick rise and a quick fall in the signal, respectively. Accordingly, the coils 250 may be turned on and off for TDM.

To implement a TDM-styled position tracking beacon, aside from simply using the multi-coil capability to transmit from different coils 250 one coil at a time, the turning on/turning off behavior needs to be sped up by several orders of magnitude in order to satisfy the latency requirement of position tracking. This can be done with a number of technical enhancements. For instance, amplifier pre-distortion may be utilized by controller 210 to reduce the turn-on time. For another instance, additional circuitry (e.g., snubber) may be utilized to release trapped energy quickly to reduce the turn-off time.

Figure 2B:
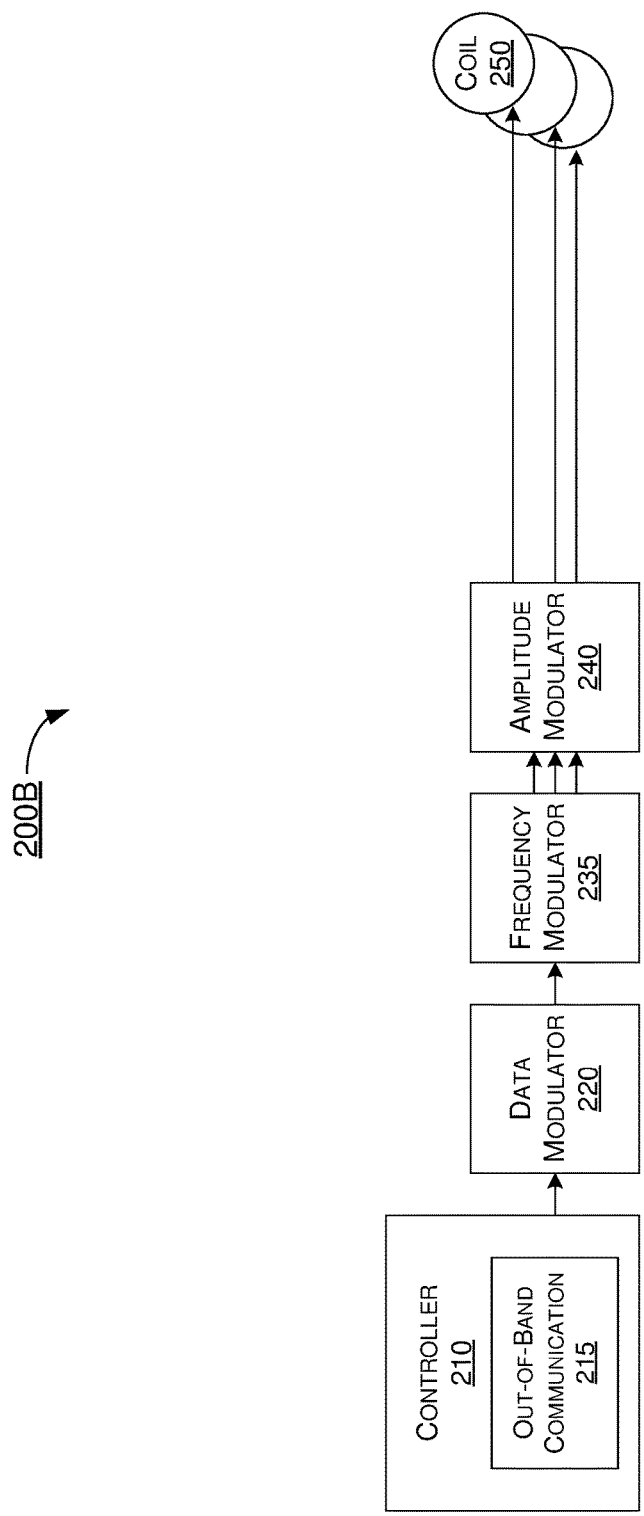
FIG. 2B is a diagram of an example scheme in accordance with an implementation of the present disclosure.

FIG. 2B illustrates an example FDM scheme 200B in accordance with an implementation of the present disclosure. Under the FDM scheme 200B, a modified wireless charging architecture of a dual-function apparatus includes a number of functional blocks, implementable in hardware (e.g., circuits/electronics), software or a combination of hardware and software, to provide the function of position tracking. Referring to FIG. 2B, the FDM scheme 200B may involve the following functional blocks: controller 210, data modulator 220, frequency modulator 235, amplitude modulator 240 and multiple coils 250. The functional block of controller 210 may include the sub-functional block of out-of-band communication 215 for out-of-band communication. Controller 210 may control operations of data modulator 220, frequency modulator 235, amplitude modulator 240 and coils 250. Each of data modulator 220, frequency modulator 235, amplitude modulator 240 may modulate a respective aspect of a signal (namely: data, frequency and amplitude) to be transmitted via coils 250. Controller 210 may control amplitude modulator 240 to provide the signal at different frequencies to all of the multiple coils 250 at a time to transmit the signal at different frequencies by way of radiated EM waves. Controller 210 may control frequency modulator 235 to modulate the signal into different frequencies for FDM.

In wireless charging, the operating frequency can be varied in real-time in order to adjust the rate of power transfer. To implement an FDM-styled position tracking beacon, controller 210 may utilize the frequency control functionality. In some implementations, closed-loop temperature compensation may be utilized to reach the stability required for position tracking.

FIG. 2C illustrates an example CDM scheme 200C in accordance with an implementation of the present disclosure. Under the CDM scheme 200C, a modified wireless charging architecture of a dual-function apparatus includes a number of functional blocks, implementable in hardware (e.g., circuits/electronics), software or a combination of hardware and software, to provide the function of position tracking. Referring to FIG. 2C, the CDM scheme 200C may involve the following functional blocks: controller 210, frequency modulator 230, data modulator 225, amplitude modulator 240 and multiple coils 250. The functional block of controller 210 may include the sub-functional block of out-of-band communication 215 for out-of-band communication. Controller 210 may control operations of data modulator 220, frequency modulator 235, amplitude modulator 240 and coils 250. Each of data modulator 220, frequency modulator 235, amplitude modulator 240 may modulate a respective aspect of a signal (namely: data, frequency and amplitude) to be transmitted via coils 250. Controller 210 may control amplitude modulator 240 to provide the signal with different codes to all of the multiple coils 250 at a time to transmit the signal at different frequencies by way of radiated EM waves. Controller 210 may control frequency modulator 235 to modulate the signal with different codes for CDM. As certain wireless charging specification requires the ability of data modulation onto the magnetic field, such capability may be utilized to implement a CDM-styled position tracking beacon.

Communication

For wireless charging, there is a certain need to communicate between the charging station and a power receiver. The goal of such communication is to achieve various purposes such as pairing, parameter negotiation, service request and release, foreign object detection, and so on. One mode of such communication is done through in-band data modulation onto the magnetic field. Another mode of communication is through the use of some external link or out-of-band communication link such as, for example, Bluetooth Low Energy (BLE).

For position tracking, some communication is also needed between a beacon station and a sensor to achieve roughly the same purposes as for wireless charging. In various implementations in accordance with the present disclosure, the physical layer and the link layer mechanisms of communication for wireless charging may be leveraged for position tracking. Higher-layer protocol(s) on top of the link layer may need to be replaced, however.

Figure 3:
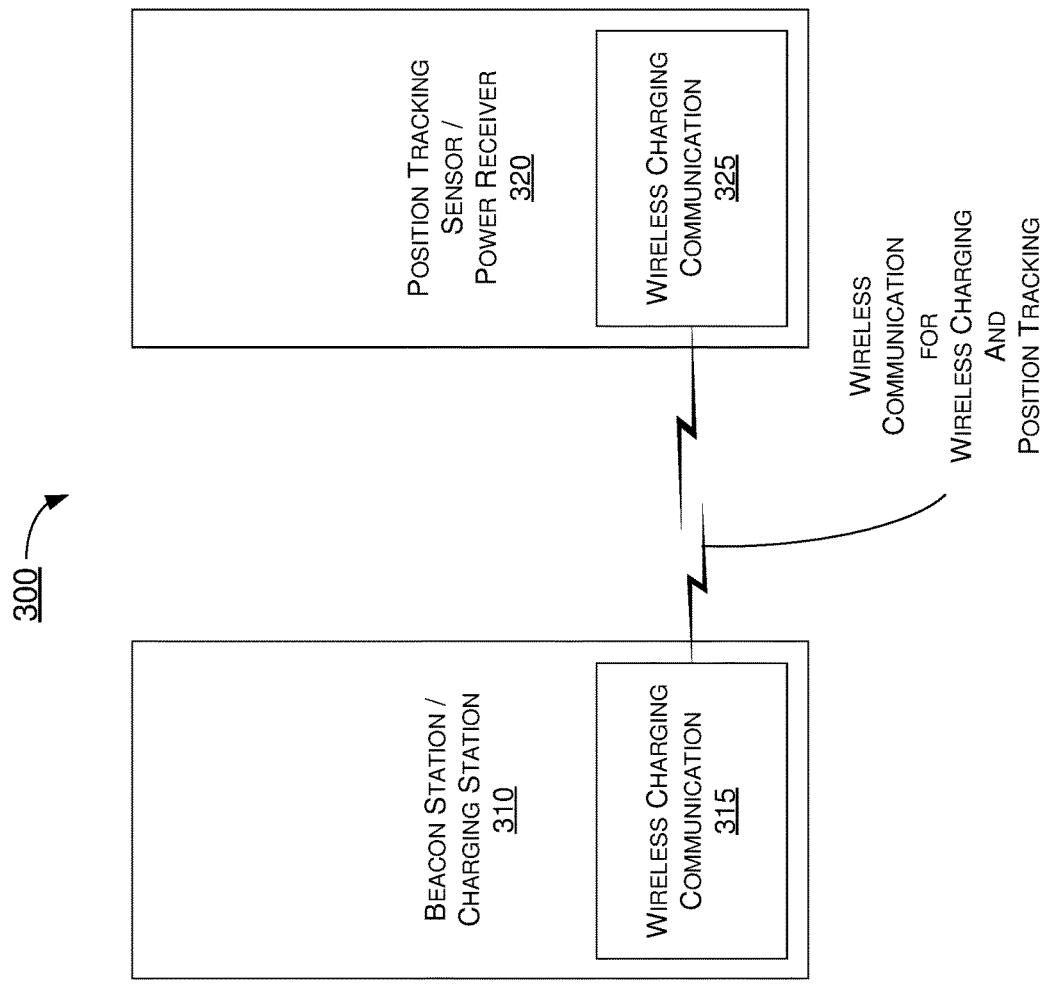
FIG. 3 is a diagram of an example system in accordance with an implementation of the present disclosure.

FIG. 3 illustrates an example system 300 in accordance with an implementation of the present disclosure. System 300 includes a beacon station/charging station 310 and a position tracking sensor/power receiver 320. System 300 is a dual-function system in which the receiver functionality of wireless charging is embedded in the overall system of position tracking sensor/power receiver 320 to leverage the communication capability of wireless charging for position tracking. By placing beacon station/charging station 310 and position tracking sensor/power receiver 320 in close proximity to each other, the two may communicate over a communication link that is typically used for wireless charging for the purposes of wireless charging and position tracking. As shown in FIG. 3, beacon station/charging station 310 includes a functional block of wireless charging communication 315, which may be implementable by hardware (e.g., a transmitter and a receiver, or a transceiver) and any suitable software. Similarly, position tracking sensor/power receiver 320 includes a functional block of wireless charging communication 325, which may be implementable by hardware (e.g., a transmitter and a receiver, or a transceiver) and any suitable software. Wireless charging communication 315 and wireless charging communication 325 may wirelessly communicate with each other for the dual purposes of wireless charging and position tracking. In some implementations, at a given time, wireless charging communication 315 and wireless charging communication 325 may wirelessly communicate with each other for the purpose of either wireless charging or position tracking.

Foreign Object Detection

For wireless charging, because the charging station can emit a non-trivial amount of energy, it is paramount to stop transmission when unintended object(s) that can potentially draw energy from the charging station appears. In some implementations in accordance with the present disclosure, actual energy drawn by a power receiver may be monitored and computed. Accordingly, a large mismatch between the amount of energy leaving the charging station and the amount of energy going into the power receiver may indicate detection of one of more foreign objects in the vicinity of the charging station. Correspondingly, appropriate measure may be taken (e.g., removal of the foreign object(s) and/or changing the location of the charging station and/or the power receiver). The communication mechanism shown in FIG. 3 6 may be utilized to convey the received energy information (e.g., from the power receiver to the charging station) to assist in foreign object detection (FOD).

For position tracking, the FOD functionality may be modified and applied. It is noteworthy that a fundamental assumption is that any position tracking sensor would not draw energy from the beacon station. To leverage the FOD functionality of wireless charging, the detection mechanism and decision rule as described above may be replaced by one that suits the purpose of position tracking. For instance, in some implementations in accordance with the present disclosure, the operation of position tracking may be stopped or otherwise halted in an event that any energy transfer out of the beacon station is detected. These changes may be implemented with, for example, additional circuitry or with some custom software.

Multiple Nearby Beacon Stations

In a typical wireless charging scenario, there is often one transmitter (i.e., the charging station) for a receiver (i.e., the power receiver) to contend with at any time. A typical communication mechanism is designed to be of a one-power-receiver-to-one-charging-station nature.

For position tracking, certain use cases may involve the collaboration of multiple beacon stations (as charging stations) and multiple power receivers. EM interference by and among the multiple beacon stations in such cases needs to be managed. Accordingly, a sensor in accordance with an implementation of the present disclosure, such as the position tracking sensor/power receiver 320 in system 300, may leverage the communication capability for wireless charging. In some implementations, the communication capability may be extended to allow a sensor to identify and communicate individually with each of multiple beacon stations.

Single-Use and Dual-Use Coils

For a dual-function apparatus (e.g., a wireless charging-position tracking device), under the right system design, the coils may be used for both the wireless charging mode and the position tracking mode. Specifically, because wireless charging needs only one coil to operate while position tracking makes use of multiple coils, the wireless charging capability may be enabled for a single coil of the multiple transmitter/receiver coils. It is noteworthy that it is possible for dedicated coils to be used for the dual purposes of wireless charging and position tracking.

Figure 4:
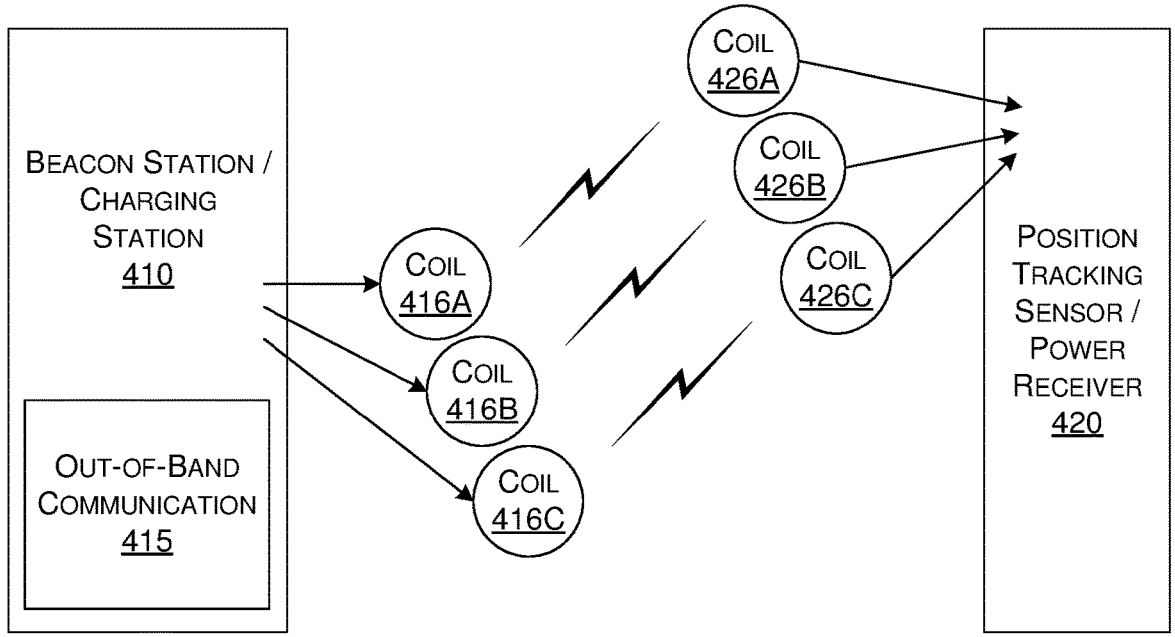
FIG. 4 is a diagram of an example system operating in dual modes in accordance with an implementation of the present disclosure.
Figure 4:
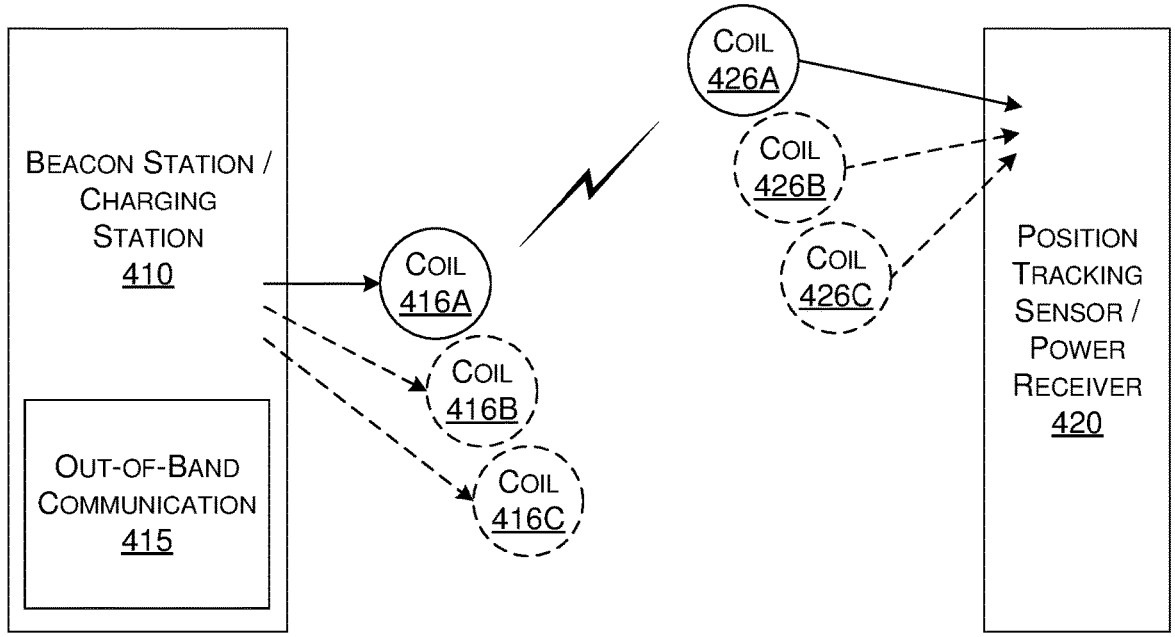

FIG. 4 illustrates an example system 400 operating in a first mode in accordance with an implementation of the present disclosure. System 400 is a dual-function system and includes a beacon station/charging station 410 and a position tracking sensor/power receiver 420. Beacon station/charging station 410 may function as a beacon station in a position tracking mode and as a charging station in a wireless charging mode. Beacon station/charging station 410 may include a functional block of out-of-band communication 415. Beacon station/charging station 410 may include multiple coils 416A, 416B and 416C. Position tracking sensor/power receiver 420 may function as a position tracking sensor in the position tracking mode and as a power receiver in the wireless charging mode. Position tracking sensor/power receiver 420 may include multiple coils 426A, 426B and 426C.

Referring to part (A) of FIG. 4, when in the position tracking mode, beacon station/charging station 410 may utilize coils 416A, 416B and 416C for position tracking. Likewise, position tracking sensor/power receiver 420 may utilize coils 426A, 426B and 426C for position tracking. Referring to part (B) of FIG. 4, when in the wireless charging mode, beacon station/charging station 410 may utilize coil 416A, but not coils 416B and 416C, for wireless charging. Similarly, position tracking sensor/power receiver 420 may utilize coil 426A, but not coils 426B and 426C, for wireless charging. In this example, coil 416A and coil 426A may be the dedicated coil for use for wireless charging. In other implementations, another coil of coils 416A, 416B and 416C of beacon station/charging station 410 may be used or otherwise dedicated for wireless charging, and another coil of coils 426A, 426B and 426C of position tracking sensor/power receiver 420 may be used or otherwise dedicated for wireless charging.

Illustrative Implementations

Figure 5:
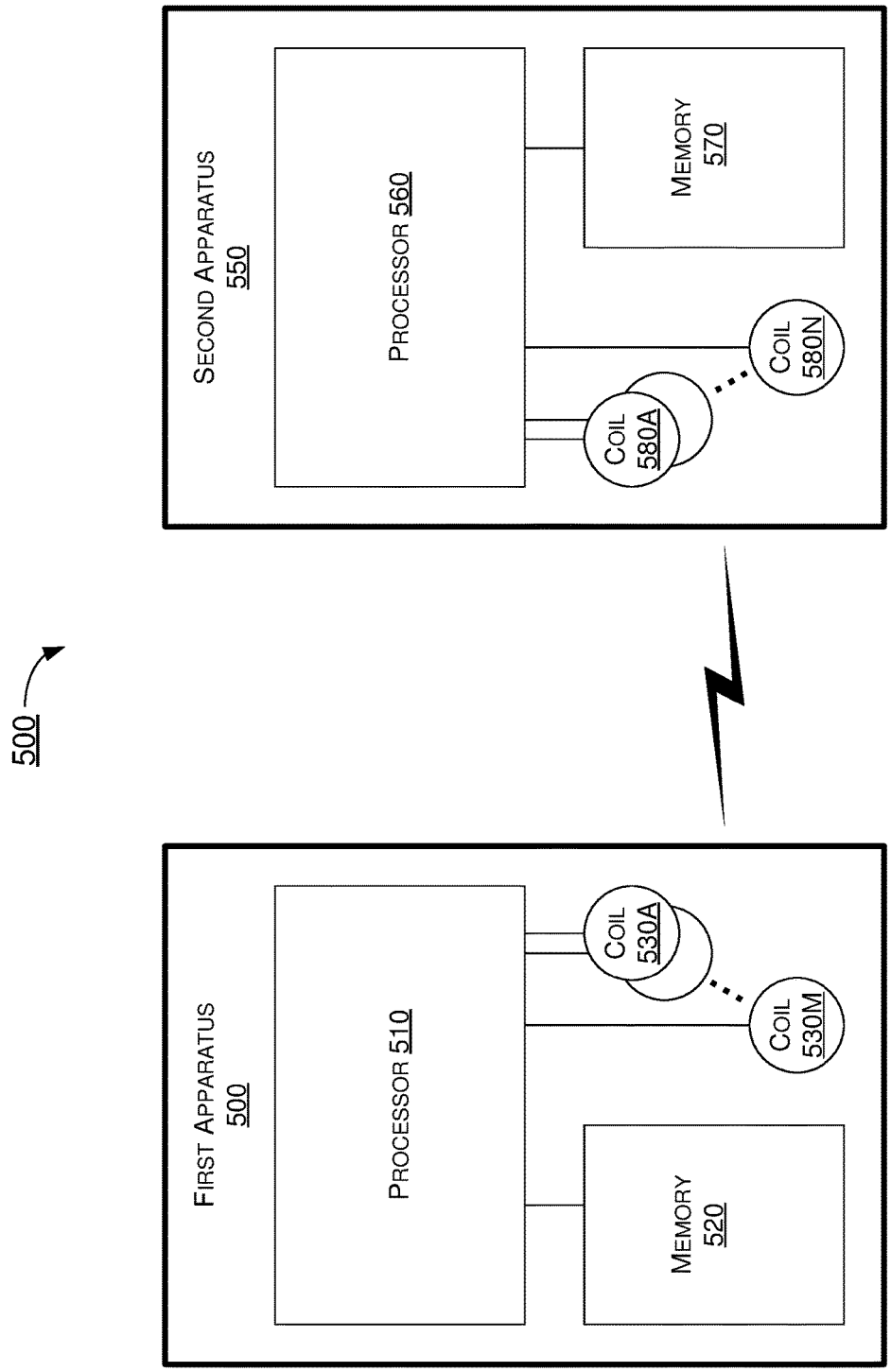
FIG. 5 is a diagram of example apparatuses in accordance with an implementation of the present disclosure

FIG. 5 illustrates an example first apparatus 500 and an example second apparatus 550 in accordance with an implementation of the present disclosure. Each of first apparatus 500 and second apparatus 550 may perform various functions to implement schemes, techniques, processes and methods described herein pertaining to combined wireless charging and position tracking, including the various schemes described above with respect to dual-function system 100, TDM scheme 200A, FDM scheme 200B, CDM scheme 200C, system 300 and system 400 as well as process 600 described below.

First apparatus 500 may be an electronic apparatus, such as a dual-functioning wireless charging station/beacon station, or a part thereof. In some implementations, first apparatus 500 may be implemented in the form of one or more IC chips such as, for example and without limitation, one or more single-core processors, one or more multi-core processors, or one or more complex-instruction-set-computing (CISC) processors. First apparatus 500 may be an example implementation of charging station/beacon station 110, beacon station/charging station 310 or beacon station/charging station 410. Each of TDM scheme 200A, FDM scheme 200B, CDM scheme 200C may be implemented in first apparatus 500. First apparatus 500 may include at least some of those components shown in FIG. 5 such as a processor 510, for example. First apparatus 500 may further include one or more other components not pertinent to the proposed scheme of the present disclosure (e.g., internal power supply, display device and/or user interface device), and, thus, such component(s) of first apparatus 500 are neither shown in FIG. 5 nor described below in the interest of simplicity and brevity.

Second apparatus 550 may be an electronic apparatus, such as a dual-functioning wireless charging station/beacon station, or a part thereof. In some implementations, second apparatus 550 may be implemented in the form of one or more IC chips such as, for example and without limitation, one or more single-core processors, one or more multi-core processors, or one or more CISC processors. Second apparatus 550 may be an example implementation of power receiver/sensor 120, position tracking sensor/power receiver 320 or position tracking sensor/power receiver 420. Each of TDM scheme 200A, FDM scheme 200B, CDM scheme 200C may be implemented in second apparatus 550. Second apparatus 550 may include at least some of those components shown in FIG. 5 such as a processor 560, for example. Second apparatus 550 may further include one or more other components not pertinent to the proposed scheme of the present disclosure (e.g., internal power supply, display device and/or user interface device), and, thus, such component(s) of second apparatus 550 are neither shown in FIG. 5 nor described below in the interest of simplicity and brevity.

In one aspect, each of processor 510 and processor 560 may be implemented in the form of one or more single-core processors, one or more multi-core processors, or one or more CISC processors. That is, even though a singular term "a processor" is used herein to refer to processor 510 and processor 560, each of processor 510 and processor 560 may include multiple processors in some implementations and a single processor in other implementations in accordance with the present disclosure. In another aspect, each of processor 510 and processor 560 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 510 and processor 560 is a special-purpose machine specifically designed, arranged and configured to perform specific tasks pertaining to combined wireless charging and position tracking between first apparatus 500 and second apparatus 550 in accordance with various implementations of the present disclosure. For instance, each of processor 510 and processor 560 may be designed, configured or otherwise adapted with electronics, circuits and/or software components to implement one or more of TDM scheme 200A, FDM scheme 200B and CDM scheme 200C. In some implementations, each of processor 510 and processor 560 may include hardware (e.g., circuits/electronics) and/or software components that implement at least the functional blocks of controller 210, data modulator 220/225, frequency modulator 230/235 and amplitude modulator 240.

In some implementations, first apparatus 500 may also include a plurality of coils 530A-530M coupled to processor 510 and capable of wirelessly transmitting energy and signals and receiving signals as EM waves. In some implementations, second apparatus 550 may also include a plurality of coils 580A-580N coupled to processor 560 and capable of wirelessly transmitting signals and receiving energy and signals as EM waves. Accordingly, first apparatus 500 and second apparatus 550 may wirelessly communicate with each other via one or more of coils 530A-530M and one or more of coils 580A-580N, respectively.

In some implementations, first apparatus 500 may further include a memory 520 coupled to processor 510 and capable of being accessed by processor 510 and storing set(s) of instructions and data therein. In some implementations, second apparatus 550 may further include a memory 570 coupled to processor 560 and capable of being accessed by processor 560 and storing set(s) of instructions and data therein. Each of memory 520 and memory 570 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 520 and memory 570 may include a type of read-only memory (ROM) such as mask ROM, programmable ROM (PROM), erasable programmable ROM (EPROM) and/or electrically erasable programmable ROM (EEPROM). Alternatively, or additionally, each of memory 520 and memory 570 may include a type of non-volatile random-access memory (NVRAM) such as flash memory, solid-state memory, ferroelectric RAM (FeRAM), magnetoresistive RAM (MRAM) and/or phase-change memory.

In the interest of brevity and to avoid repetition, detailed description of the capabilities and functions of each of first apparatus 500 and second apparatus 550 is provided below with respect to process 600.

FIG. 6 illustrates an example process 600 in accordance with an implementation of the present disclosure. Process 600 may be an example implementation of schemes, techniques, processes and methods described herein for combined wireless charging and position tracking, such as those described above with respect to with respect to dual-function system 100, TDM scheme 200A, FDM scheme 200B, CDM scheme 200C, system 300 and system 400, whether partially or completely. Process 600 may represent an aspect of implementation of features of first apparatus 500 and/or second apparatus 550. Process 600 may include one or more operations, actions, or functions as illustrated by one or more of blocks 610 and 620, as well as sub-blocks 612, 614, 622 and 624. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively in a different order. Process 600 may be implemented by first apparatus 500 and/or second apparatus 550. Solely for illustrative purposes and without limitation, process 600 is described below in the context of first apparatus 500 and/or second apparatus 550. Process 600 may begin at block 610.

At 610, process 600 may involve a processor (e.g., processor 510 or processor 560) of an apparatus (e.g., first apparatus 500 or second apparatus 550) operating in a first mode to effect wireless charging via at least a first coil of a plurality of coils of the apparatus. Depending on whether process 600 is implemented in first apparatus 500 or second apparatus 550, process 600 may involve either of sub-blocks 612 and 614 in operating in the first mode. When implemented in first apparatus 500 as a beacon station/charging station, process 600 may, at 612, involve processor 510 wirelessly emitting energy via at least the first coil as a charging station to charge a power receiver. When implemented in second apparatus 550 as a position tracking sensor/power receiver, process 600 may, at 614, involve processor 560 wirelessly receiving energy via at least the first coil as a power receiver. Process 600 may proceed from 610 to 620.

At 620, process 600 may involve processor 510 operating in a second mode to effect position tracking via at least a second coil of the plurality of coils of the apparatus. Depending on whether process 600 is implemented in first apparatus 500 or second apparatus 550, process 600 may involve either of sub-blocks 622 and 624 in operating in the second mode. When implemented in first apparatus 500 as a beacon station/charging station, process 600 may, at 622, involve processor 510 wirelessly radiating EM waves via at least the second coil as a beacon station to track a position of a sensor. When implemented in second apparatus 550 as a position tracking sensor/power receiver, process 600 may, at 624, involve processor 560 detecting EM waves from a beacon station via at least the second coil as a sensor to determine a position of the beacon station.

In some implementations, in wirelessly radiating the EM waves via at least the second coil, process 600 may involve the processor (e.g., processor 510) radiating the EM waves through multiple coils of the plurality of coils, including the second coil, with time-division multiplexing (TDM), frequency-division multiplexing (FDM), or code-division multiplexing (CDM).

In some implementations, in radiating the EM waves with TDM, process 600 may involve the processor (e.g., processor 510) performing one or more of: (1) applying amplitude pre-distortion to reduce a turn-on time; and (2) utilizing a snubber to release trapped energy to reduce a turn-off time.

In some implementations, in radiating the EM waves with FDM, process 600 may involve the processor (e.g., processor 510) performing frequency control using closed-loop frequency compensation.

In some implementations, in radiating the EM waves with CDM, process 600 may involve the processor (e.g., processor 510) performing data modulation onto the EM waves.

In some implementations, process 600 may further involve the processor (e.g., processor 510 or processor 520) wirelessly communicating with one other apparatus by performing either of: (1) performing in-band data modulation onto EM waves; and (2) communicating with the other apparatus using an out-of-band communication link. Moreover, process 600 may further involve the processor detecting one or more foreign objects (FODs) external to the apparatus and the other apparatus. Additionally, process 600 may further involve the processor informing the other apparatus of the detecting of the one or more FODs by the wirelessly communicating.

In some implementations, in detecting the one or more FODs, process 600 may involve the processor (e.g., processor 510 or processor 520) detecting of the one or more FODs in the first mode by performing a number of operations. For instance, process 600 may involve the processor computing a mismatch between an amount of transmitted energy and an amount of received energy for the wireless charging. Moreover, process 600 may involve the processor determining an existence of the one or more FODs in response to the mismatch exceeding a mismatch threshold.

Alternatively, or additionally, in detecting the one or more FODs, process 600 may involve the processor (e.g., processor 510 or processor 520) detecting of the one or more FODs in the second mode by a number of performing operations. For instance, process 600 may involve the processor detecting energy transfer out of a beacon station for the position tracking. Additionally, process 600 may involve the processor determining an existence of the one or more FODs in response to the detecting.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   operating in a first mode to effect wireless charging via at least a first coil of a plurality of coils of an apparatus; and
   operating in a second mode to effect position tracking via at least a second coil of the plurality of coils of the apparatus,
   wherein the operating in the second mode comprises wirelessly radiating electromagnetic (EM) waves via multiple coils of the plurality of coils, including the second coil, as a beacon station to track a position of a sensor with time-division multiplexing (TDM), frequency-division multiplexing (FDM) or code-division multiplexing (CDM).

2. The method of claim 1, wherein the operating in the first mode comprises wirelessly emitting energy via at least the first coil as a charging station to charge a power receiver.

3. The method of claim 1, wherein the radiating of the EM waves with TDM comprises performing one or more of:
   applying amplitude pre-distortion to reduce a turn-on time; and
   utilizing a snubber to release trapped energy to reduce a turn-off time.

4. The method of claim 1, wherein the radiating of the EM waves with FDM comprises performing frequency control using closed-loop frequency compensation.

5. The method of claim 1, wherein the radiating of the EM waves with CDM comprises performing data modulation onto the EM waves.

6. The method of claim 1, wherein the operating in the first mode comprises wirelessly receiving energy via at least the first coil as a power receiver, and wherein the operating in the second mode comprises detecting electromagnetic (EM) waves from a beacon station via at least the second coil as a sensor to determine a position of the beacon station.

7. The method of claim 1, further comprising:
   wirelessly communicating with one other apparatus by performing either of:
   performing in-band data modulation onto electromagnetic (EM) waves; and
   communicating with the other apparatus using an out-of-band communication link.

8. The method of claim 7, further comprising:
   detecting one or more foreign objects (FODs) external to the apparatus and the other apparatus; and
   informing the other apparatus of the detecting of the one or more FODs by the wirelessly communicating.

9. The method of claim 8, wherein the detecting of the one or more FODs comprises detecting of the one or more FODs in the first mode by performing operations comprising:
   computing a mismatch between an amount of transmitted energy and an amount of received energy for the wireless charging; and
   determining an existence of the one or more FODs in response to the mismatch exceeding a mismatch threshold.

10. The method of claim 8, wherein the detecting of the one or more FODs comprises detecting of the one or more FODs in the second mode by performing operations comprising:
    detecting energy transfer out of a beacon station for the position tracking; and
    determining an existence of the one or more FODs in response to the detecting.

11. An apparatus, comprising:
    a plurality of coils; and
    a processor, the processor operable in a first mode to effect wireless charging via at least a first coil of the plurality of coils of an apparatus, the processor further operable in a second mode to effect position tracking via at least a second coil of the plurality of coils of the apparatus,
    wherein, in operating in the second mode, the processor controls the plurality of coils to wirelessly radiate electromagnetic (EM) waves via multiple coils of the plurality of coils, including the second coil, as a beacon station to track a position of a sensor with time-division multiplexing (TDM), frequency-division multiplexing (FDM) or code-division multiplexing (CDM).

12. The apparatus of claim 11,
    wherein, when operating in the first mode, the processor performs either of:
    wirelessly emitting energy via at least the first coil as a charging station to charge a power receiver; and
    wirelessly receiving energy via at least the first coil as the power receiver.

13. The apparatus of claim 11, wherein, in radiating the EM waves with TDM, the processor performs one or more of:
    applying amplitude pre-distortion to reduce a turn-on time; and
    utilizing a snubber to release trapped energy to reduce a turn-off time.

14. The apparatus of claim 11, wherein, in radiating the EM waves with FDM, the processor performs frequency control using closed-loop frequency compensation.

15. The apparatus of claim 11, wherein, in radiating the EM waves with CDM comprises performing data modulation onto the EM waves.

16. The apparatus of claim 11, wherein the processor is capable of performing operations comprising:

wirelessly communicating with one other apparatus by performing either of:
  performing in-band data modulation onto electromagnetic (EM) waves; and
  communicating with the other apparatus using an out-of-band communication link;
detecting one or more foreign objects (FODs) external to the apparatus and the other apparatus; and
informing the other apparatus of the detecting of the one or more FODs by the wirelessly communicating,
wherein the detecting of the one or more FODs comprises either of:
  detecting of the one or more FODs in the first mode by performing operations comprising:
    computing a mismatch between an amount of transmitted energy and an amount of received energy for the wireless charging; and
    determining an existence of the one or more FODs in response to the mismatch exceeding a mismatch threshold; and
  detecting of the one or more FODs in the second mode by performing operations comprising:
    detecting energy transfer out of a beacon station for the position tracking; and
    determining an existence of the one or more FODs in response to the detecting.

* * * * *